US011989633B2

(12) United States Patent
Goel et al.

(10) Patent No.: US 11,989,633 B2
(45) Date of Patent: May 21, 2024

(54) SHARED LEARNING ACROSS SEPARATE ENTITIES WITH PRIVATE DATA FEATURES

(71) Applicant: Stripe, Inc., San Francisco, CA (US)

(72) Inventors: Ashish Goel, Stanford, CA (US); Peter Lofgren, Palo Alto, CA (US)

(73) Assignee: Stripe, Inc., South San Francisco, CA (US)

( * ) Notice: Subject to any disclaimer, the term of this patent is extended or adjusted under 35 U.S.C. 154(b) by 1192 days.

(21) Appl. No.: 16/258,116

(22) Filed: Jan. 25, 2019

(65) Prior Publication Data

US 2020/0242492 A1 Jul. 30, 2020

(51) Int. Cl.
*G06N 20/20* (2019.01)
*G06F 18/243* (2023.01)
*G06N 3/084* (2023.01)
*G06N 5/043* (2023.01)

(52) U.S. Cl.
CPC ....... *G06N 20/20* (2019.01); *G06F 18/24323* (2023.01); *G06N 3/084* (2013.01); *G06N 5/043* (2013.01)

(58) Field of Classification Search
CPC ........ G06N 5/043; G06N 20/20; G06N 3/084; G06K 9/6282
See application file for complete search history.

(56) References Cited

PUBLICATIONS

Kokkinos et al., Breaking Ties of Plurality Voting in Ensembles of Distributed Neural Network Classifiers Using Soft Max Accumulations, IFIP Advances in Information and Communication Technology, Sep. 2014. (Year: 2014).*
Wei, L.J., The Adaptive Biased Coin Design for Sequential Experiments, The Annals of Statistics, vol. 6 No. 1, pp. 92-100, 1978. (Year: 1978).*
Wang et al., Classification Spanning Private Databases, American Association for Artificial Intelligence, 2006. (Year: 2006).*
Vaidya et al., A Random Decision Tree Framework for Privacy-Preserving Data Mining, IEEE Transactions on Dependable and Secure Computing, vol. 11 No. 5, Sep./Oct. 2014. (Year: 2014).*
Polamuri, Saimadhu, How the Random Forest Algorithm Works in Machine Learning, May 2017. (Year: 2017).*

(Continued)

*Primary Examiner* — Marshall L Werner
(74) *Attorney, Agent, or Firm* — BAKERHOSTETLER

(57) ABSTRACT

Embodiments herein use transfer learning paradigms to facilitate classification across entities without requiring the entities access to the other party's sensitive data. In one or more embodiments, one entity may train a model using its own data (which may include at least some non-shared data) and shares either the scores (or an intermediate representation of the scores). One or more other parties may use the scores as a feature in its own model. The scores may be considered to act as an embedding of the features but do not reveal the features. In other embodiments, parties may be used to train part of a model or participate in generating one or more nodes of a decision tree without revealing all its features. The trained models or decision trees may then be used for classifying unlabeled events or items.

20 Claims, 12 Drawing Sheets

(56) References Cited

PUBLICATIONS

He et al., Practical Lessons from Predicting Clicks on Ads at Facebook, ADKDD'14: Proceedings of the Eighth International Workshop on Data Mining for Online Advertising, pp. 1-9, Aug. 2014. (Year: 2014).*

Yu et al., Privacy-Preserving SVM Classification on Vertically Partitioned Data, 2006. (Year: 2006).*

Wan et al., Privacy-Preservation for Gradient Descent Methods, 13th ACM SIGKDD International Conference on Knowledge Discovery and Data Mining, Aug. 2007. (Year: 2007).*

* cited by examiner

400

```
┌─────────────────────────────────────────────────────────────┐
│ Given an event, having associated event data, to be predicted by │
│ assigning a prediction label, use a trained first model to generate a first │ ⟋ 405
│ score related to a label classification using one or more features │
│ extracted from the event data by a first party │
└─────────────────────────────────────────────────────────────┘
                              │
                              ▼
┌─────────────────────────────────────────────────────────────┐
│ Provide the first score to a second party for the second party to use as │ ⟋ 410
│ an additional feature │
└─────────────────────────────────────────────────────────────┘
                              │
                              ▼
┌─────────────────────────────────────────────────────────────┐
│ Use, by the second party, a second trained model, one or more features │
│ extracted from the event data by the second party, and the first score as │ ⟋ 415
│ an additional feature to generate a second score related to a label │
│ classification │
└─────────────────────────────────────────────────────────────┘
                              │
                              ▼
┌─────────────────────────────────────────────────────────────┐
│ Continue by alternating between the parties—with a party using the │
│ score (or scores) provided by the other party as a feature (or features) │
│ along with one or more features extracted from the event data (in which │ ⟋ 420
│ at least one or more of the extracted features are not known to the other │
│ party) to generate the next score or, if it is the final classifier model, a │
│ final score │
└─────────────────────────────────────────────────────────────┘
                              │
                              ▼
┌─────────────────────────────────────────────────────────────┐
│ Use a final output score to assign a classification label to the event │ ⟋ 425
└─────────────────────────────────────────────────────────────┘
```

SHARED LEARNING ACROSS SEPARATE ENTITIES WITH PRIVATE DATA FEATURES

BACKGROUND

A. Technical Field

The present disclosure relates generally to systems and methods for computer learning that can provide improved computer performance, features, and uses. More particularly, the present disclosure relates to systems and methods for machine learning across entities without the entities sharing sensitive data.

B. Background

The Internet and other technology-assisted networks have dramatically increased the prevalence of interconnected interactions between entities. These entities may include, but are not limited to, individuals, businesses, government agencies, non-profit organizations, etc. As part of the interactions, entities frequently need to share data for various purposes. However, one or more of the entities may not, or cannot share, some of the data associated with the interaction. For example, a medical organization may not be able to share certain patient information due to patient privacy laws. Or, a business may not what to share commercially sensitive information or private customer data. As a result, parties involved in an interaction may have different parts of the overall data related to the interaction.

Since no one party has access to all of the data related to the interaction, it may be difficult, if not impossible, to recognize patterns within the data that may be helpful to one or more of the parties involved in the interaction. Accordingly, what is needed are systems and methods for shared learning across separate entities with private data features that are not shared across the entities.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts a methodology for using trained models to classify an event or activity, in which at least some of the data is not shared between entities when classifying the event or activity, according to embodiments of the present patent document.

DETAILED DESCRIPTION OF EMBODIMENTS

Figure 1:
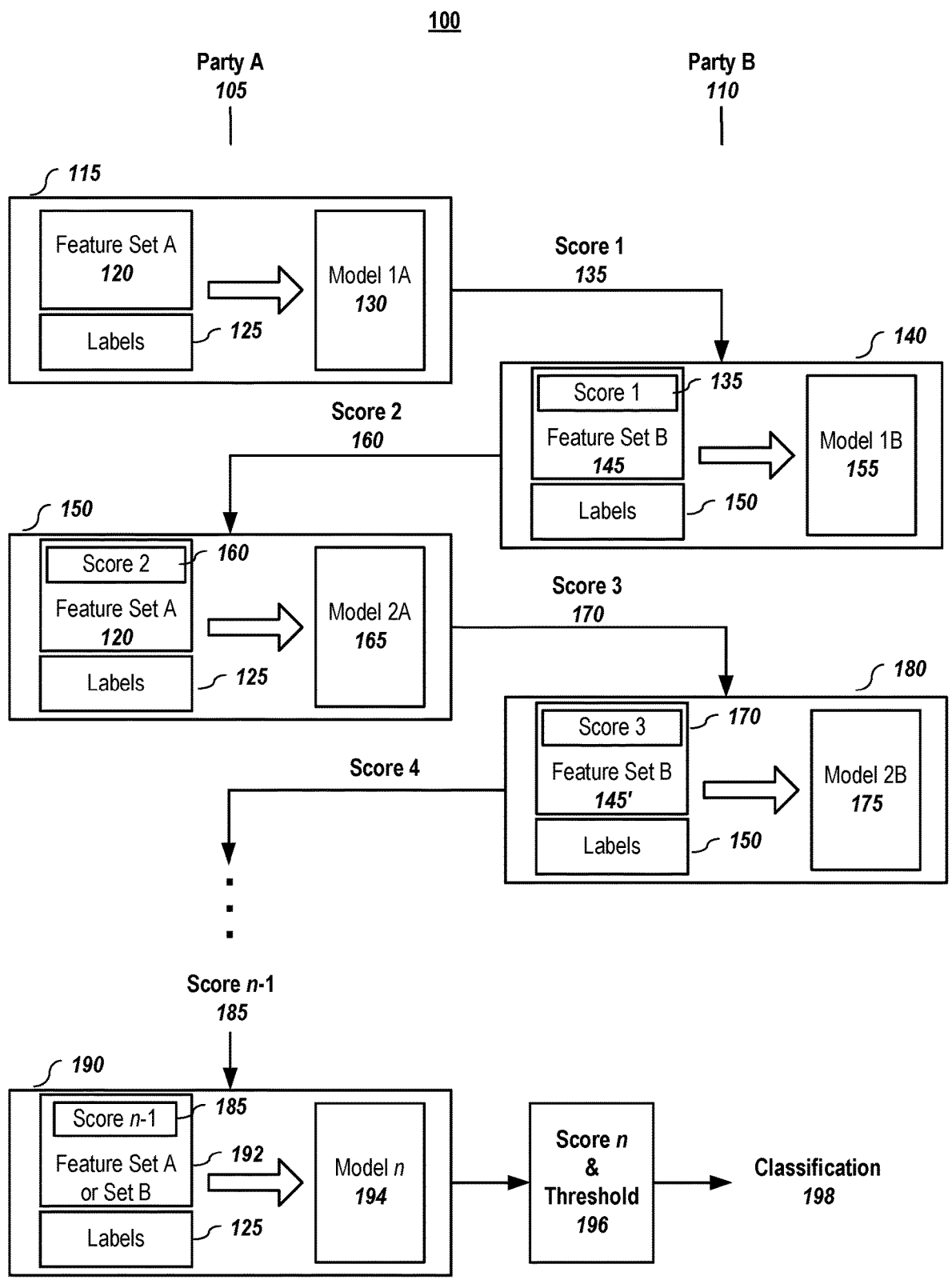
FIG. 1 graphically depicts an example methodology for training models in which at least some of the data is not shared between entities, according to embodiments of the present patent document.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present patent document, described below, may be implemented in a variety of ways, such as a process, an apparatus, a system, a device, or a method on a tangible computer-readable medium.

Components, or modules, shown in diagrams are illustrative of exemplary embodiments of the present patent document and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the present patent document and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. A set may comprise zero or more elements.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Among the important use cases for data sharing is machine learning for classification problems. Examples of such use cases include, but are not limited to, detecting fraud in a transaction, issuing credit, and running marketing campaigns. It would be extremely beneficial to share learning across entities that can help classify events without requiring the entities access to the other party's sensitive data. Another such case would be developing a training data set from existing data for all parties, where each example (or record) in the training data set includes some attributes known to both parties but that each party can associate with other data that is known only to that party and is considered sensitive (or private) information by that party.

Consider a setting where two parties, A and B, want to participate in shared machine learning. Imagine that the training and test data sets consist of labels L, which are known to both A and B, features $F_A$ known only to party A, and features $F_B$ known only to party B. A goal would be to train a classifier to predict L without sharing the private features.

For example, imagine that Payment Processor A and Merchant B perform a joint machine learning endeavor to decide which transactions disputed by Merchant B's customers have a high likelihood of being upheld (i.e., the original transaction is upheld, or equivalently, the dispute is reversed) if represented. Both parties have a shared label (which disputes resulted in a reversal) but Merchant B might have customer and provider features, whereas Payment Processor A might have card history.

Thus, an issue is whether these two parties can jointly train a classifier, which uses both feature sets without revealing the features to each other. That is, one of the key inquiries is how to develop embodiments in which the parties can train a classifier that leverages each party's data, without sharing or otherwise exposing a party's sensitive data. It should also be noted that sometimes the labels that different organizations possess on each example/record may be related but not identical. Thus, another aspect of embodiments is to eliminate the issue of different data labeling.

Previous approaches shared features, as opposed to transfer learning. Such approaches require that one enterprise can directly query the data of another enterprise. However, as noted above, an entity may not want or may not be able to allow another entity full access it all of its data.

Accordingly, in one or more embodiments, transfer learning paradigms may be used to facilitate classification across entities with non-shared/private data. One organization may train a model using its own data (which may include shared data) and shares either the scores or an intermediate representation of the scores, such as the outputs of a layer of a neural network, or a score or scores from each decision tree. In one or more embodiments, these scores may be considered as an embedding of the features but do not reveal the features. One skilled in the art shall recognize that such approaches are novel because if the labels are related, the scores represent an embedding of the data tailored to a specific use case without directly revealing the data. It should be noted that a general-purpose embedding would preserve all aspects of the sensitive data; whereas in embodiments herein, the embedding provides only an obfuscated view of the data but is still useful for learning related labels.

Presented below are various embodiments for shared learning across separate entities with private data features that are not shared across the entities. Embodiments provided herein are provided by way of example and involve two or three separate entities for sake of simplicity; however, one skilled in the art shall recognize these embodiments may be extended to multi-party sharing. It shall also be noted that examples illustrated herein are related to events (or activities) but the event could an item or other element.

B. Iterative Model Embodiments

In one or more embodiments, a system may comprise four components, each of which may be implemented in hardware, software, firmware, or a combination thereof. The system, as a whole, operates on a corpus of labeled training examples and trains a machine-learning-based classifier. One component may be an initial model trainer, which take a set of labeled examples, and generate a partially trained machine learning model using features that it has access to. In one or more embodiments, an initial model trainer may also, at a later stage, take an unlabeled example, and predict a tentative classification or labeling of this example, based on features which it has access to. Another component is one or more iterative model trainers, each of which can take a partially trained machine learning model, perhaps on features which it has no access to, and improve this model by performing additional training using features which it has access to. An iterative model trainer can also, at a later stage, take an unlabeled example, and predict a tentative classification or labeling of this example, based on features which it has access to along with a history of classification predictions from all previous model trainers.

In one or more embodiments, there may be a model training broker component, which is responsible for coordinating and communication between the initial model trainer and the iterative model trainers and between multiple copies of the iterative model trainers during model training.

In one or more embodiments, a model prediction evaluation broker component, which is responsible for taking an unlabeled example, and sends it to the initial model trainer and the iterative model trainers in a series of steps to obtain a prediction for the trained model trained.

In one or more embodiments, the model trainer and iterative model trainers may be run by one particular party without the need for any knowledge of the features that the other parties have. In one or more embodiments, the model training broker component and the model prediction evaluation broker component may need to know the relative importance to give to the features for each party but does not require any knowledge of the features themselves or their values.

It shall also be noted that, in embodiments, there may be no difference between the model trainers. That is, an initial model trainer is an iterative model trainer and may be called repeatedly.

1. Training

Figure 2:
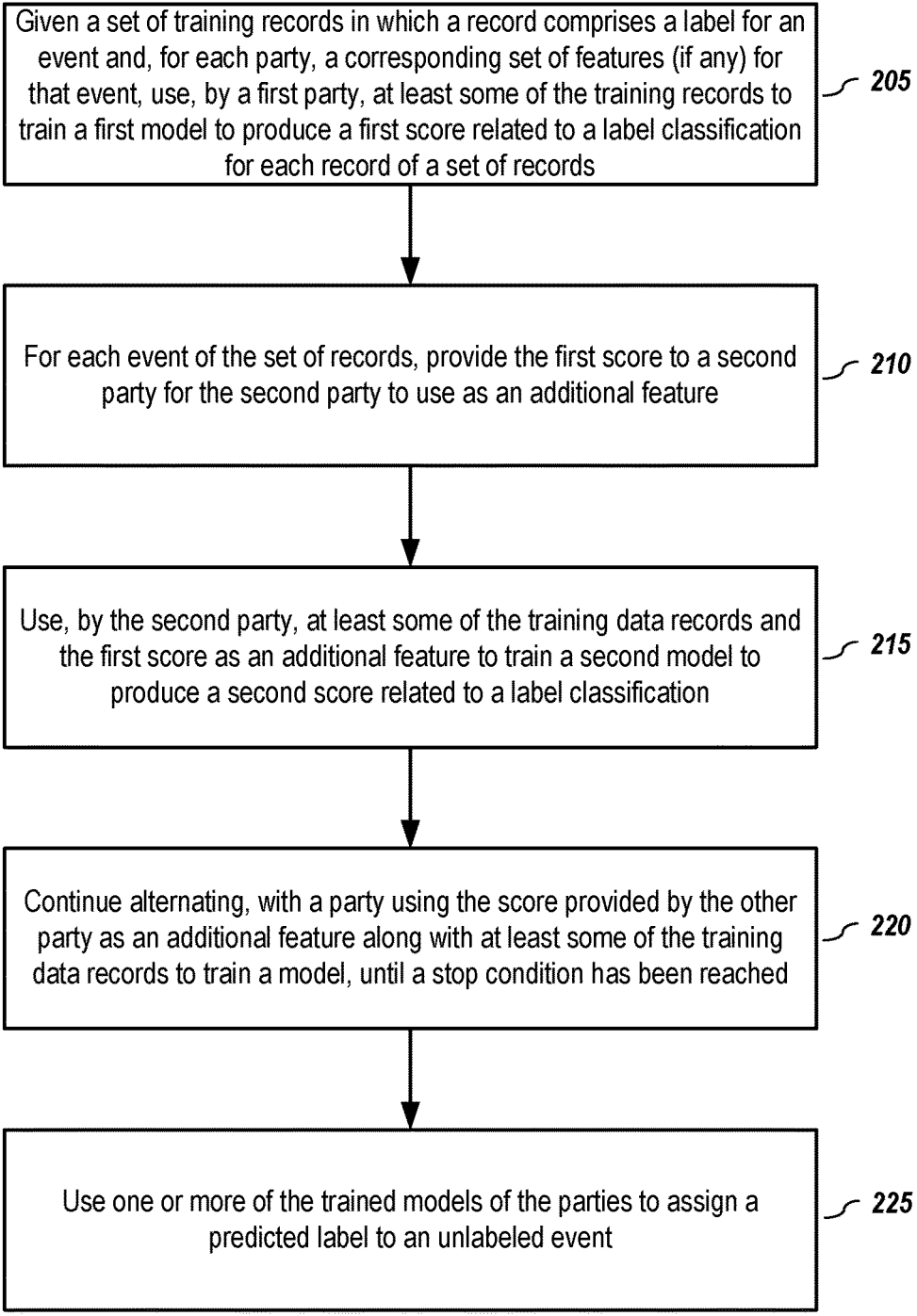
FIG. 2 depicts a methodology for training models in which at least some of the data is not shared between entities, according to embodiments of the present patent document.

FIG. 1 graphically depicts a methodology for training models in which at least some of the data is not shared between entities, according to embodiments of the present patent document. In the depicted example of FIG. 1, there are two parties, Party A 105 and Party B 110. In one or more embodiments, there may be more parties, and there may also be a broker or intermediate (not depicted in FIG. 1) that may help facilitate communications between the parties. FIG. 2, in conjunction with FIG. 1, depicts a methodology for training models in which at least some of the data is not shared between entities, according to embodiments of the present patent document. It shall be noted that a binary classification labeling example is provided in reference to these figures but that embodiments are not so limited but may be extended to multi-class problems.

Figure 3:
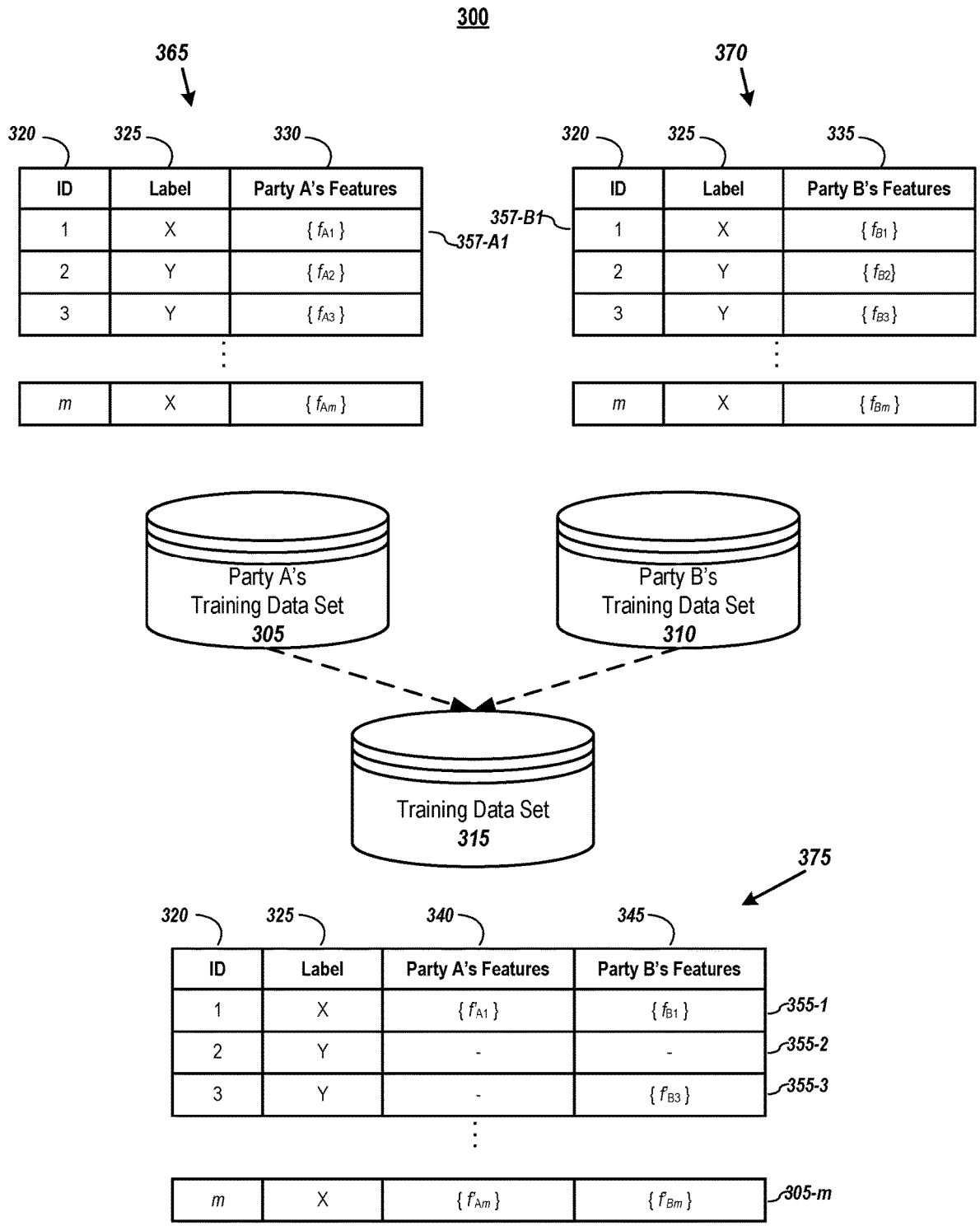
FIG. 3 depicts a collaborative data set of training records comprising records of events or activities with partial data from multiple parties' data sets, according to embodiments of the present document.

As illustrated in FIG. 3, in one or more embodiments, a collaborative data set 315 of training records comprising records (e.g., records 355-*x*) of events with data 340 from Party A's set of training records 305 and data 345 from Party B's set of training records 310. That is, Party A and Party B may have interacted upon a number of prior events. These events have associated data, which may be features or may be used to generate features. As shown in the example records 365 (Party A) and 370 (Party B), in one or more embodiments, each event may correspond to a record (e.g., 357-A1 for Party A and 357-B1 for Party B). In one or more embodiments, a record may comprise: a unique identifier 320, or record index, that is shared or known in common between the parties; and a known label 325 that is also known to the parties. It shall be noted that the identifier and/or label used by the party need not be the same, but they are correlated so that when Party A refers to an event, Party B knows which of its records that corresponds to. Also shown in FIG. 3, each party has its associated set of features 330 (Party A) and 335 (Party B). In one or more embodiments, some or none of the features known by one party may be known or accessible to the other party.

In one or more embodiments, a collaborative training data set 315 may be formed from the parties' data sets. As illustrated in the collaborative records 375, the identifier 320 may be used to correlate the records across the parties. In one or more embodiments, a record in the collaborative training data set 375 may also comprise: the classification label 325; all, some, or none of Party A's features 340; and all, some, or none of Party B's features. Concerning the features, it may be that one party may be able to share all its features, but the other party may not, or both parties may have limitations on sharing features. It should also be noted that which features may be shared may be determined at a per record level, at a per party level, at an opposing party level, other factors, or some combination thereof. In any event, it shall be noted that while the events may be in common between the parties, some or all of their features may not be shared.

Returning to FIGS. 1 and 2, given a set of training records (e.g., records 365), in which each training record corresponds to an event and comprises (1) an event identifier, (2) a label about the event, and (3) a set of features for that event, and in which the event identifier and the label about the event of the training record are known by a second party (e.g., columns 320 and 325) but at least one or more of the features of the set of features are not shared, for at least some of the training records, with the second party, Party A may train (205) a model (e.g., Model 1A 130) that produces for each event corresponding to a training record a first-party score related to a label classification of the event. In one or more embodiments, the model training may be performed using at least: (1) the set of training records, and (2) second-party scores, if available. It should be noted that in a first iteration or round, there may not be any second-party scores available. For example, Party A possesses a training data set, which comprises, for each record, a feature set (e.g., Feature Set A 120) and a corresponding label 125 classifying the event or activity. As noted above, the features used to train the model may be directly from the feature set of the training data set or may be derived from such data through one or more pre-processes steps. In any event, Party A uses at least some of the data from its training data set 127 to train a model (e.g., Model 1A 130).

Having trained a model, Party A can provide (210), for each record in a set of records, the score output by the trained model to a second party. In one or more embodiments, the second party may then use these scores as additional features. For example, Party A 105 can provide its set of scores 135 to Party B 115, which may be include in its features set 145.

Party B may then use at least some of the training data records and the first scores to train (215) a second model to produce a second set of scores related to the labels. In like manner as with Party A, having trained a model (e.g., Model 1B 155), Party B can provide, for each record in the set of records, the scores output by the trained model to Party A. In one or more embodiments, Party A may then use these scores as additional features to train another model (e.g., Model 2A 165).

In one or more embodiments, the parties may continue alternating (220), with a party using the scores provided by the other party as additional features along with at least some of the training data records to train a model, until a stop condition has been reached. It should be noted that, in one or more embodiments, the feature sets may include (for one or more iterations or throughout the entire process) sets of scores from more than one iteration when training a model. For example, as illustrated in FIG. 1, Party B's feature set 145' when receiving the set of scores 170 is denoted as 145' instead of 145 to indicate that the prior set of scores 135 have been incorporated into the feature set 145 to form modified feature set 145'. It should also be noted that, alternatively, a party may (for one or more iterations or throughout the entire process) include only the original features and the most current set of score supplied by the other party. In yet another alternative embodiment, a party may (for one or more iterations or throughout the entire process) include the original features and some subset of prior iteration sets of scores supplied by the other party (e.g., in the fifth iteration, a party chooses to only uses as additional features the sets of scores from the third and fifth iterations). In one or more embodiments, a stop condition may comprise: a number of iterations have been reached, a sufficient prediction quality level tested on a test data set having been achieved, having reached a model's ability to improve, and a prediction error between iterations being less than a threshold.

Finally, in one or more embodiments, the output of the $n^{th}$ classifier model 194 is a score that, based upon a thresholding value or values, may be used (225) to assign a classification label 198.

It shall be noted that embodiments disclosed herein may be used with any classifier that outputs a score and not just a prediction; this includes, but is not limited to, logistic regression, random forests, decision trees, and neural networks (e.g., if the final output of a neural network model is the output of a soft max layer, then, in one or more embodiments, the raw scores before the soft max layer may be output and supplied to the other party).

2. Classification Inference/Prediction

Given the jointly trained models, one or more of these trained models may be used to predict a label for an unlabeled event or activity. FIG. 4 depicts a methodology for using trained models to classify an event (or item), in which at least some of the data is not shared between entities when classifying the event, according to embodiments of the present patent document.

In one or more embodiments, given an event, having associated event data, to be predicted by assigning a prediction label, a trained first model is used (405) to generate a first score related to a label classification using one or more features extracted from the event data by a first party. The first score is also provided (410) to a second party to use as an additional feature.

The second party using a second trained model, the first score, and one or more features extracted from the event data by the second party generates (415) a second score related to a label classification.

In one or more embodiments, the process may continue by alternating between the parties—with a party using the score (or scores) provided by the other party as a feature (or features) along with one or more features extracted from the event data (in which at least one or more of the extracted features are not known to the other party) to generate (420) the next score or, if it is the final classifier model, a final score. Based upon a final score from the final trained classifier model, a label is assigned (425) to the event. In one or more embodiments, one or more threshold values may be used in relation to the final score to assign the label, and this thresholding step may be part of the trained model or a separate step.

C. Random Forest Embodiments

1. General Introduction

In one or more embodiments, random forests may be employed to make predictions without requiring parties to share data. Embodiments herein provides formal guarantees of exact simulation. In one or more embodiments, a random forest is formed from repeated applications of a decision tree, which in turn repeatedly invokes a split primitive—an embodiment of which follows:

Training: Given a set of labeled examples, find the best feature set f or (and associated threshold t) for splitting this set of examples into two sets, such that the two sets are as distinct as possible in terms of the labels, as measured by a loss function. The feature and threshold are recorded, and if this is going to be a leaf node, the score (e.g., fraction of positive examples) for each side of the split is also recorded.

Prediction: Given an unlabeled example, use the feature set f and threshold t to determine on which side of the split the example lies. If this is a leaf node, the score of the side on which the example falls may also be output.

To apply this split primitive, in one or more embodiments, assume a broker that has all the labeled examples, but without any of the features of any of the parties (i.e., the broker has the labels and a key used to identify the example, such as, a transaction ID). Further assume that both parties have access to the keys and the labels. At training time, applying the split primitive once comprises the steps:

1. The broker sends the set of labeled examples (i.e., the keys and the labels) to both parties;

2. Each party computes a best split of this set with its own feature set, remembers the feature and threshold used for the split, and sends the split examples (but not the feature or the threshold used for the split) back to the broker.

3. The broker can choose the better of the two splits and updates the set of labeled example for the next iteration (if applicable). If it is the end node, the process stops.

At prediction time, since the broker knows which party's split was better, the broker sends the unlabeled event/activity to that party. The receiving party in turn applies its split and lets the broker know which side of the split this example belongs to, and if this is a leaf node, a score.

It should be noted that such an approach to shared learning provide several interesting aspects, including but not limited to:

1. This approach gives an exact simulation of the split primitive, and hence decision trees and random forests—without one party needing to know another party's features, or even how many features the other side has. In one or more embodiments, the broker has the labels and keys, but may not even have those if the parties send back a score for the split (e.g., the cross-entropy).

2. Random forests often have bagging, where some randomly chosen examples may be dropped from each decision tree. In one or more embodiments, the broker may perform this operation without needing to know the features, and hence, not knowing the features presents no obstacles to such an implementation.

3. Examples sometimes have weights (e.g., for class weights). Such situations pose no difficulty, since each side may take these weights into account while performing its split and while computing the scores. In general, any weights that depend on the key and/or on the labels may be used.

4. Embodiments of the present disclosure allow developers to use existing tools to implement the decision trees. For example, XGBoost, which is described in its documentation as "an optimized distributed gradient boosting library designed to be highly efficient, flexible and portable," may be used. In one or more embodiments, in each decision tree, weights for each example may exist, which may be computed based on the splits in the previous trees, which may be known to the broker—no knowledge of features is necessary to compute example weights in each subsequent decision tree of XGBoost.

5. Different notions of loss, e.g., cross-entropy, pose no difficulty.

6. Restrictions on tree depth, leaf purity, leaf size, etc. can be easily imposed by the broker without knowing any features.

7. It should also be noted that the privacy properties are very strong since no party gets to find which features (or even how many features) the other party has or uses, and can only infer from each split primitive that the examples on one side of the split are on one side of some unknown threshold for some unknown feature or features belonging to the other party.

8. Feature dropout, which is a common technique used by random forests to avoid overtraining, may also employed in embodiments. It may be assumed that feature dropout is being applied to each split primitive. It should be noted that, in embodiments, dropout may also be similarly implemented at the tree level or for any combination node-level and tree-level implementation. In one or more embodiments, there are at least two approaches to dropout may be used:

a. Each feature gets retained with probability p, independently of other features. This dropout may be applied by each party separately and poses no difficulty to implement. Neither party needs to know even the number of features that the other party has, and the broker does not need to know this information either.

b. A total of K features may be retained. For an exact simulation of this dropout, the broker knows the number of features that each party has. To apply the split primitive, the broker may first choose K random balls from a bin that contains $|F_A|$ blue and $|F_B|$ yellow balls (where $F_A$ are the features known to Party A and $|F_A|$ is the number of $F_A$ features, and $F_B$ are the features known to Party B and $|F_B|$ is the number of $F_B$ features), and the number of balls of each color dictates the parameter that the broker passes to the corresponding party as the number of features to be retained for that split.

In one or more embodiments, one may experiment with the dropout parameters to find an appropriate one for the specific implementation, and it seems as easy to experiment with 8(a) as 8(b). So somewhat surprisingly, a broker does not even need to know the sizes of $|F_A|$ and $|F_A|$, which means that, in one or more embodiments, the broker may, in fact, just be one of the parties.

Presented below, to further facilitate illustration, as additional explanation of embodiments of training (i.e., decision tree generation) and prediction.

2. Decision Tree Generation Embodiments

Figure 5:
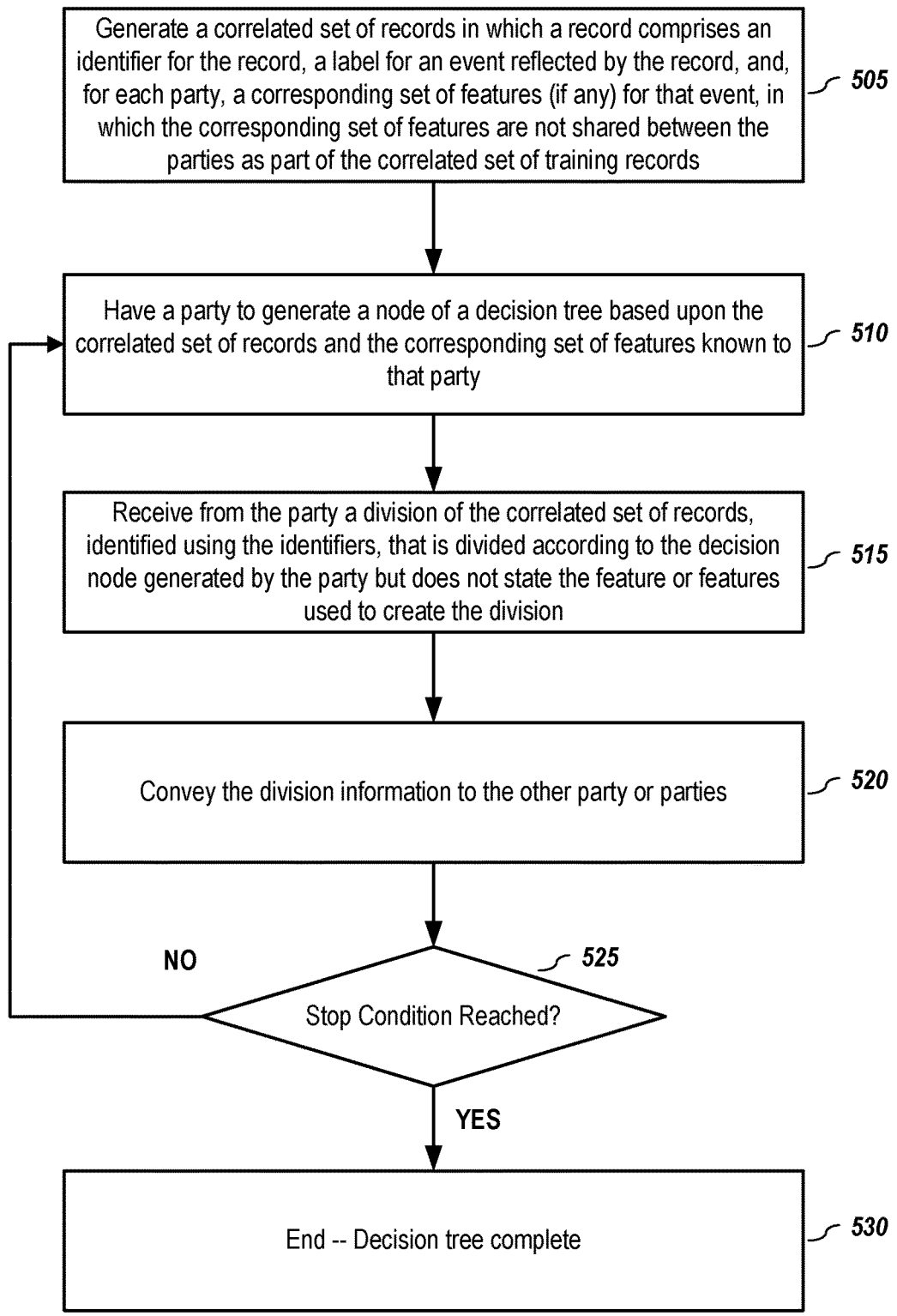
FIG. 5 depicts a methodology for generating decision trees for a random forest model in which at least some of the data is not shared between parties, according to embodiments of the present patent document.

FIG. 5 depicts an example methodology for generating decision trees for a random forest model in which at least some of the data is not shared between parties, according to embodiments of the present patent document.

Figure 6:
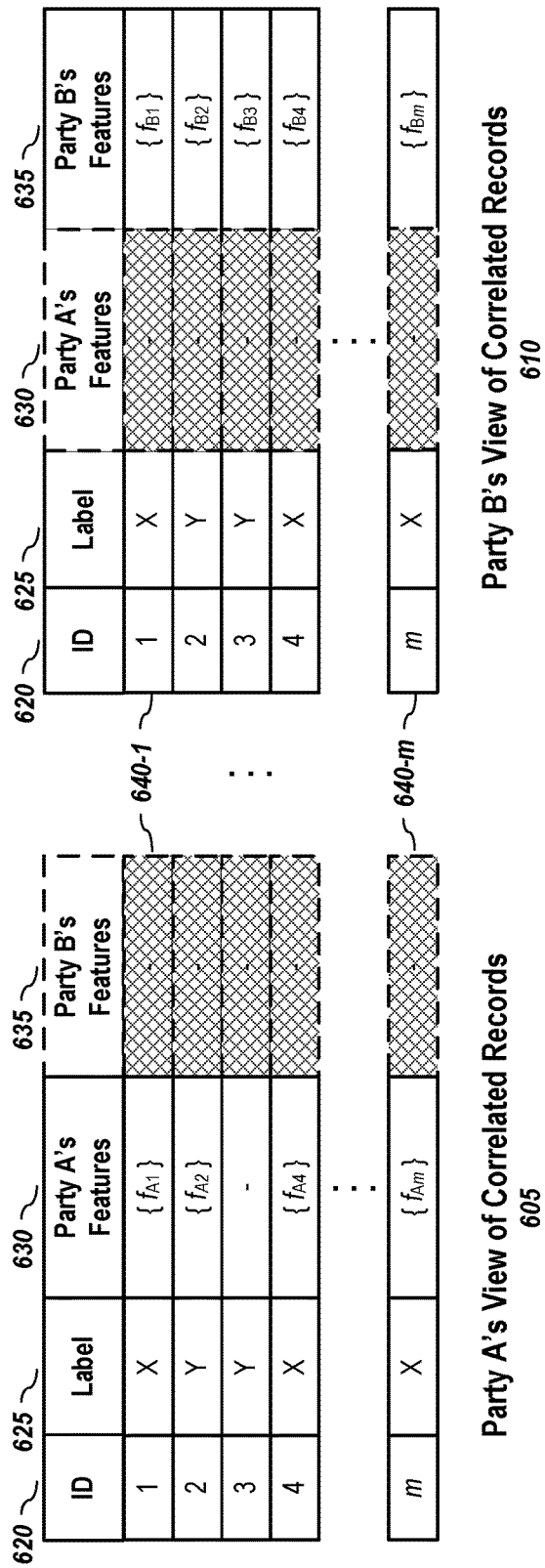
FIG. 6 depicts an example correlated set of example records, according to embodiments of the present patent document.

As illustrated in FIG. 5, in one or more embodiments, a correlated set of training/example records is created (505). FIG. 6 depicts an example correlated set of example records, according to embodiments of the present patent document. In one or more embodiments, a record (e.g., 605-*x*) comprises an identifier or key 620 for the record (e.g., a transaction id), a label 625 for an event of the record, and a corresponding set of one or more features for the party (if any) (e.g., features 630 for Party A or features 635 for Party B) for that event, in which at least some of the corresponding set of features are not shared between the parties as part of the correlated set of training records. In the depicted embodiment in FIG. 6, each other party does not have access to any of the features of the other party; the column for the other party's features is shown (in dashed lines and hashed fill) to illustrate the correlation between the records, but, as a practical matter, each set of records would most likely not include a column of for the other party as it would contain no entries. It shall be noted that the identifier and/or label used by the party need not be the same, but they are correlated so that when Party A refers to an event, Party B knows which of its records that corresponds to.

In one or more embodiments, a broker may act as an intermediary to coordinate the generation of the data set and/or help coordinate generation of decision trees. For example, in one or more embodiments, the parties (e.g., Party A and Party B) may send records to the broker, who compiles or correlates them and returns the correlation information to the parties. It shall be noted that the broker may be a third-party intermediary; alternatively, in one or more of the embodiments, one of the parties may act as the broker or fulfill parts of a broker's functions. In yet other embodiments, the parties may be split broker functions.

Figure 7:
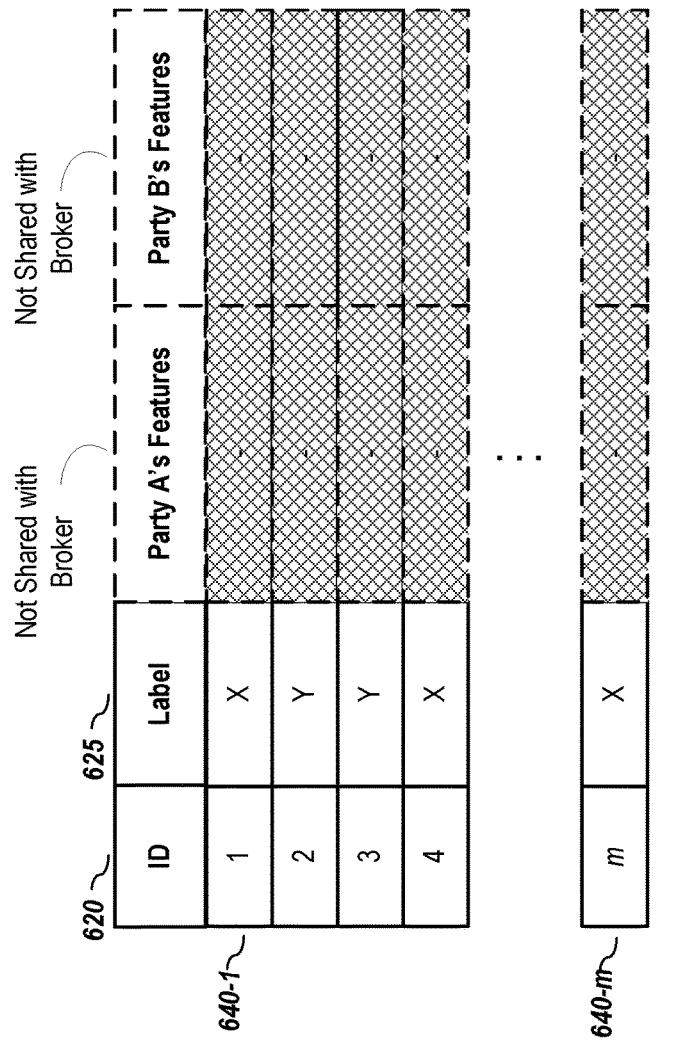
FIG. 7 depicts an example correlated set of records as available to a broker, according to embodiments of the present patent document.

FIG. 7 depicts an example correlated set of records 700 as available to a broker, according to embodiments of the present patent document. In the depicted example, the broker is a third-party broker that does not have access to any of the parties' feature data; the columns for the parties' features are shown (in dashed lines and hashed fill) to illustrate the correlation between the records, but, as a practical matter, each set of records would comprise the columns for unique identifier or key 620 and the label 625. Thus, as illustrated in the example records shown in FIGS. 6 and 7, while each party (Party A, Party B, and broker) does not have access to any features of another party, the parties have access to the identifying key and the labels of the records.

Returning to FIG. 5, when generating a decision tree for a random forest, an aim, given a set of labeled examples, is to find the best feature or features f (and an associated threshold t) for splitting the set of examples into two sets, such that the two sets are as distinct as possible in terms of the labels, as measured by some loss function. In the depicted embodiments, the broker selects (510) a party to generate a node of a decision tree using the correlated set of training records and the corresponding set of features known to that party to select the best split. In one or more embodiments, the broker may select the party at random. In one or more embodiments, the party that is selected records for that node of that tree the feature or features and the threshold, and if this decision node is a leaf node, the party records the score (e.g., fraction of positive examples) for each side of the split.

In one or more embodiments, the broker receives (515) from the party a division of the correlated set of records, identified using the identifiers, that is divided according to the decision node generated by the party but does not state the feature or features used to create the division. The broker may then convey (520) the division information to the other party or parties.

In one or more embodiments, the process (i.e., steps 510-520) may be repeated (525) until a stop condition is reached. In one or more embodiments, a stop condition may be when a final leaf node has been reached. In such case, the final scores may also be reported, and the decision tree completed (530).

Figure 8:
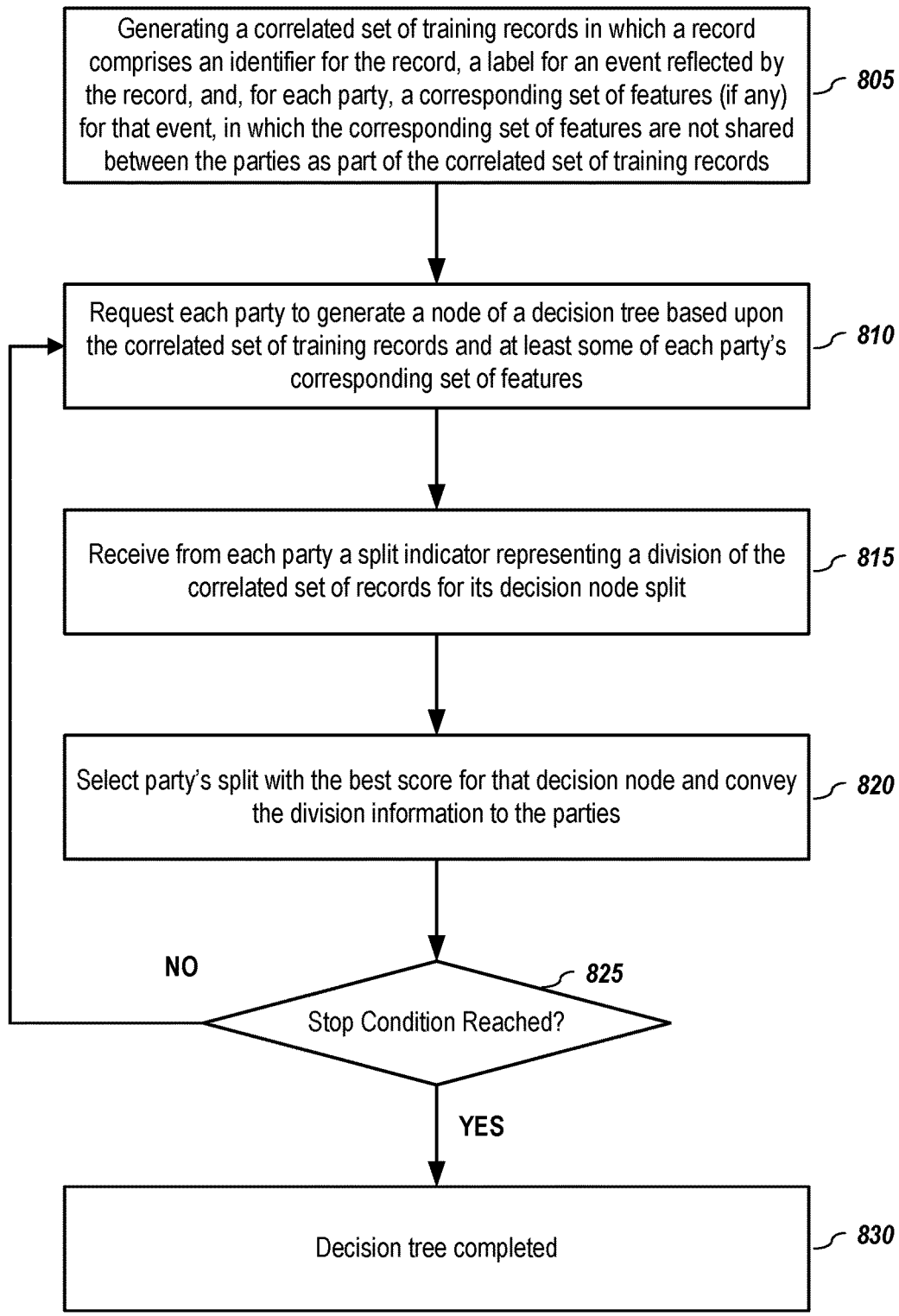
FIG. 8 depicts another methodology for generating decision trees for a random forest model in which at least some of the data is not shared between parties, according to embodiments of the present patent document.

FIG. 8 depicts another example methodology for generating decision trees for a random forest model in which at least some of the data is not shared between parties, according to embodiments of the present patent document. The embodiment of FIG. 8 is similar to that of FIG. 5 but differs regarding the selection of which Party generates a split for a node. Recall that when generating a decision tree for a random forest, an aim, given a set of labeled examples, is to find the best feature or features f (and an associated threshold t) for splitting the set of examples into two sets, such that the two sets are as distinct as possible in terms of the labels, as measured by some loss function. Thus, in one or more embodiments, the broker may ask each party to split the data set and select the party with the better split.

Specifically, similar to the example embodiment depicted in FIG. 5, in one or more embodiments, a broker may generate or obtain (805) a correlated set of training records in which a record comprises an identifier for the record, a label for an event/activity reflected by the record, and, for each party, a corresponding set of features (if any) for that event/activity, in which the corresponding set of features are not shared between the parties as part of the correlated set of training records. As just mentioned in the prior paragraph, the broker requests (810) each party to generate a node of a decision tree based upon the correlated set of training records and at least some of each party's corresponding set of features. In one or more embodiments, the broker receives (815) from each party a split indicator representing a division of the correlated set of records for its decision node split. The party with the better split is selected (820) by the broker and is notified by the broker to record, for that node of that tree, the feature or features and threshold, and if this decision node is going to be a leaf node, the score (e.g., fraction of positive examples) for each side of the split is recorded.

In one or more embodiments, the process (i.e., steps 810-820) may be repeated (825) until a stop condition is reached. In one or more embodiments, a stop condition may be when a final leaf node has been reached. In such case, the final scores may also be reported, and the decision tree completed (830).

In yet other embodiments, each step of the decision tree process may include tossing a (biased) coin to choose either of the two parties, and the chosen entity uses a standard decision tree splitting step on its own features to partition one decision node of one decision tree of the current forest. Such embodiments come with some strong properties. For example, suppose one is to simulate a random forest with feature dropout 1−f (e.g., f is 1/sqrt(K) where K is the number of features). As long as f is smaller than the fraction of features that are with either party, the probability of the best feature being selected for any one split does not change.

It shall noted that, in one or more embodiments, the approaches of FIGS. 5, 8, and the preceding paragraph may be combined in generating a decision tree. That is, the decision regarding which party is to generate the split for a node may be different for nodes with the same tree. For example, for one node, the decision may be selected at random; however, for another node of the same tree, the broker may ask each party to split the records and may select the party with the better split.

It shall also be noted that all or a subset of steps from embodiments discussed above, or a combination thereof, may be repeated to produce a number of decision trees for a random forest. While not illustrated in FIGS. 5 & 8, it shall be noted, as discussed above, that dropout at a node level and/or tree level may be used.

3. Random Forest Prediction Embodiments

Figure 9:
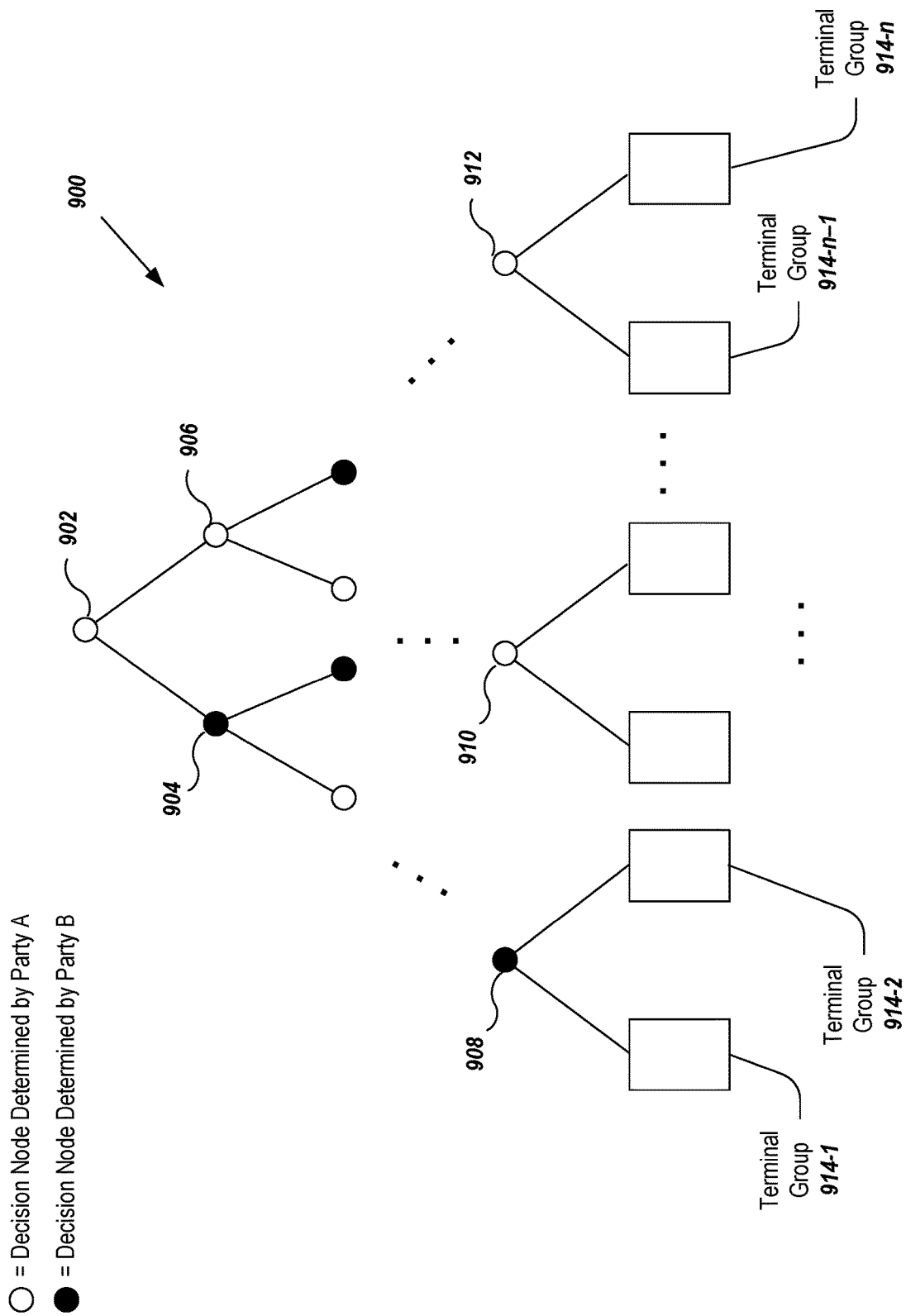
FIG. 9 depicts an example decision tree that may be part of a random forest of decision trees, according to embodiments of the present disclosure.

Having generated a number of decision trees that form a random forest, the random forest may be used to predict an unlabeled event/activity. FIG. 9 depicts an example decision tree that may be part of a random forest of decision trees, according to embodiments of the present disclosure. As depicted in FIG. 9, the decision tree 900 comprises a plurality of decision nodes (e.g., nodes 902, 904, 906, 908, etc.) that terminate in leaf nodes (e.g., nodes 914-x) that comprise terminal groups from the data set, which represent a label or classification. Each of the decision nodes are associated with a party and that party set or determined the feature set (i.e., one or more features) and corresponding threshold value or values for the split that node. As illustrated in the example depicted in FIG. 9, certain nodes are associated with Party A (i.e., white nodes) and certain nodes are associated with Party B (i.e., black nodes), based upon the building of the decision tree as explained in the prior section.

Figure 10:
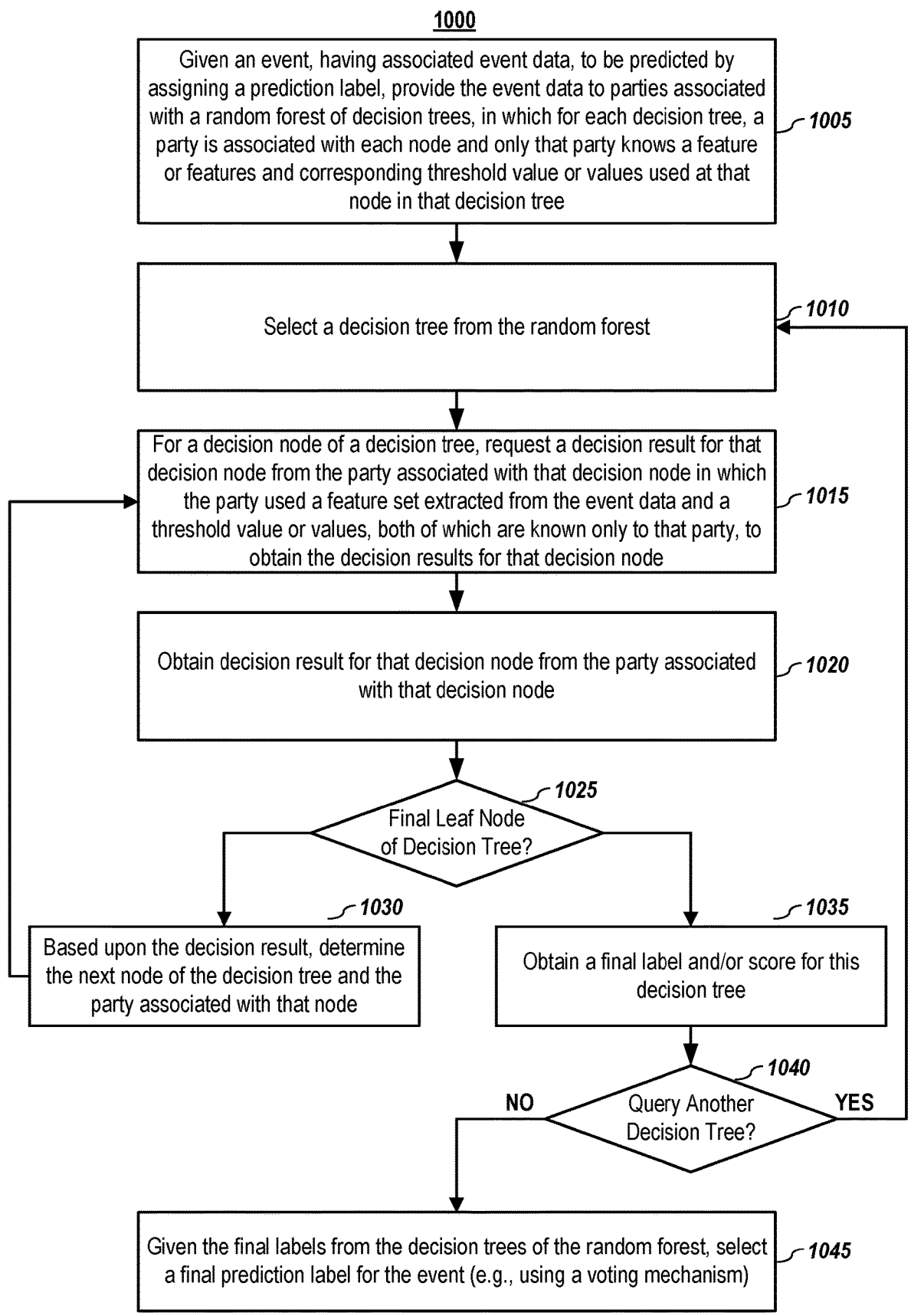
FIG. 10 depicts a methodology for classifying an unlabeled event/activity using a decision tree, like the example decision tree depicted in FIG. 9, according embodiments of the present disclosure.

FIG. 10 depicts a methodology for classifying an unlabeled event/activity using a decision tree, like the example decision tree depicted in FIG. 9, according embodiments of the present disclosure. As illustrated in FIG. 10, in one or more embodiments, given an event, having associated event data, to be predicted by assigning a prediction label, a broker provides (1005) the event data to parties associated with a random forest of decision trees. It should be noted that, for each decision tree in the random forest, a party is associated with each node and only that party knows the feature set (possibly also the corresponding threshold value or values) used at that node in that decision tree.

In one or more embodiments, the broker selects (1010) a decision tree from the random forest. For a decision node of the decision tree, the broker requests (1015) a decision result for that decision node from the party associated with that decision node. For example, using the decision tree 900 in FIG. 9 by way of illustration, since the first decision node 902 is associated with Party A, the broker requests Party A to generate a decision result given the event data. Party A will use a feature set extracted from the event data and a threshold value or values, both of which were determined during generation of the decision tree from example data and both of which are known only to Party A, to obtain the decision results for that decision node 902.

The broker obtains (1020) the decision results for that decision node from the party associated with that decision node. That is, in making a prediction about the unlabeled event, the feature set f and threshold t determine which side of the split the unlabeled event lies.

If the decision node is (1025) not a final leaf node, the broker uses the split decision result to determine (1030) a pathway in the next level of the decision tree to the next node in the decision tree (and the party associated with that node). Returning the example in FIG. 9, assuming that Party A's decision result indicated a split to the left toward node 904, the broker identifies that it is associated with Party B and returns to step 1015, in which Party B is asked to generate a decision result given the event data. Party B will use a feature set extracted from the event data and a threshold value or values, both of which were determined during generation of the decision tree from example data and both of which are known only to Party B, to obtain the decision results for that decision node 904.

In one or more embodiments, the steps 1015-1030 are repeated until the decision node is (1025) a leaf node. In such case, a score (and/or label) of the side on which the unlabeled event falls is output.

In one or more embodiments, the score or label may be used to classify or present a prediction for the unlabeled event. Alternatively, as illustrated in FIG. 10, one or more additional decision trees from the random forest may be queried (1040) to obtain a score or label. For example, in one or more embodiments, the process may return to step 1010 in which another decision tree is selected and the process (i.e., steps 1015-1040) repeated. In one or more embodiments, the number of decision trees may be user selected, may be preset, or may be all of the decision trees of the random forest.

Figure 11:
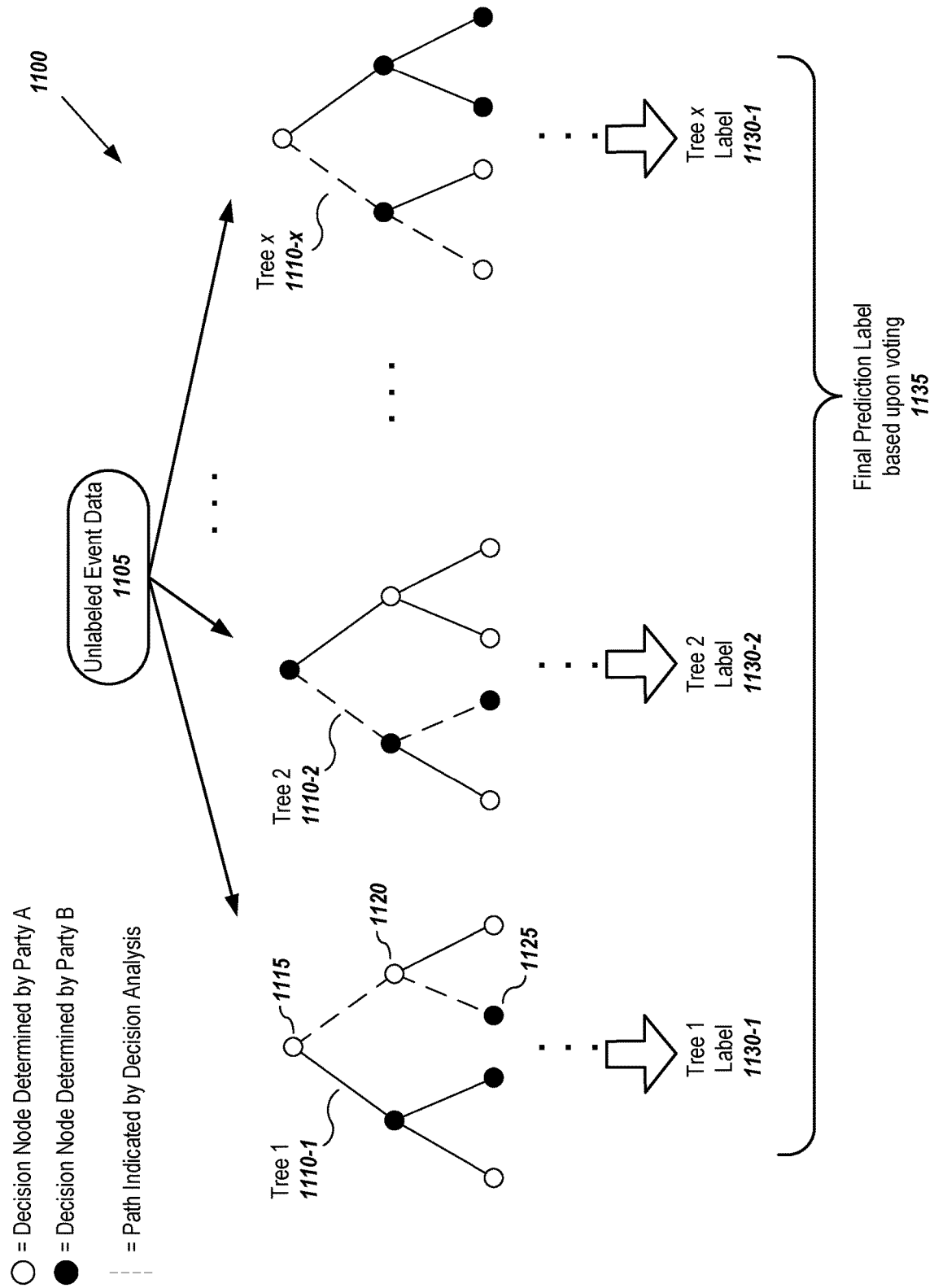
FIG. 11 graphically depicts a set of queried decision trees and a final label assigned to an event, according to embodiments of the present disclosure.

Finally, in one or more embodiments, given the set of scores and/or labels output by the queried decision trees of the random forest, a final prediction label/score for the event may be selected (1045). In one or more embodiments, a voting mechanism may be used to select the final label. By way of illustration, FIG. 11 graphically depicts a set of queried decision trees and a final label assigned to an event based upon a voting mechanism according to embodiments of the present disclosure. Shown in FIG. 11 are a set of x decision trees (Tree 1 1110-1 through Tree x 1110-x) of random forest 1100. Each of the decision trees start with the unlabeled event data 1105 and, following methodology like that described in connection with FIG. 10, each works through its tree (e.g., in Tree 1 the decisions obtained at the nodes as indicated by responsible party cause the pathway to go from node 1115 (Party A) to node 1120 (Party A), to node 1125 (Party B), and so forth) until each tree outputs a final label (e.g., labels 1130-1 through 1130-x). Then, given the final labels of the trees, a voting mechanism may be used to assign a final label 1135. For example, if the event is a credit card transaction and 8 of the 10 queried decision trees indicated that it is a fraudulent transaction, the label assigned to the event may be "FRAUDULENT." It shall be noted that different thresholds may be used for the voting. For example, if more than 30% of the queried decision tress indicate fraud, the event may be classed as fraud out of caution. It shall be noted that different voting mechanism may be used.

In one or more embodiments, if the output is score, the scores may be averaged (evenly or weighted) to obtain the final score. In one or more embodiments, the final score may be sufficient; alternatively, in one or more embodiments, one or more post-processing steps may use the final score. For example, the final score may be input into a neural network model or other machine learning model the further classifies the event using the score as a feature input or an embedding.

One skilled in the art shall recognize other implementation and uses of the outputs from a decision tree and/or a random forest, which may be used herein and are part of the current disclosure.

D. Additional Embodiments

In one or more embodiments, a single neural network may be trained, where a first layer of the network is the features of both parties, i.e., both $F_A$ and $F_B$. The next K layers, for an appropriate K, may have a special structure: each layer is partitioned into two parts, the A part and the B part, and the A part of any layer is connected to only the A part of the previous layer; for the very first layer, the features $F_A$ are called part A and the features $F_B$ are called B. The next J layers of the neural network may be fully connected. During training, a broker performs backpropagation across the top J layers, and then the backpropagated values from the $(K+1)^{th}$ layer are sent to party A for the A side, and party B for the B side, which then adjust the weights for the A sides and the B sides.

One skilled in the art shall recognize other configurations and permutations which may be employed and which are within the scope of the current patent document.

E. Computing System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 12:
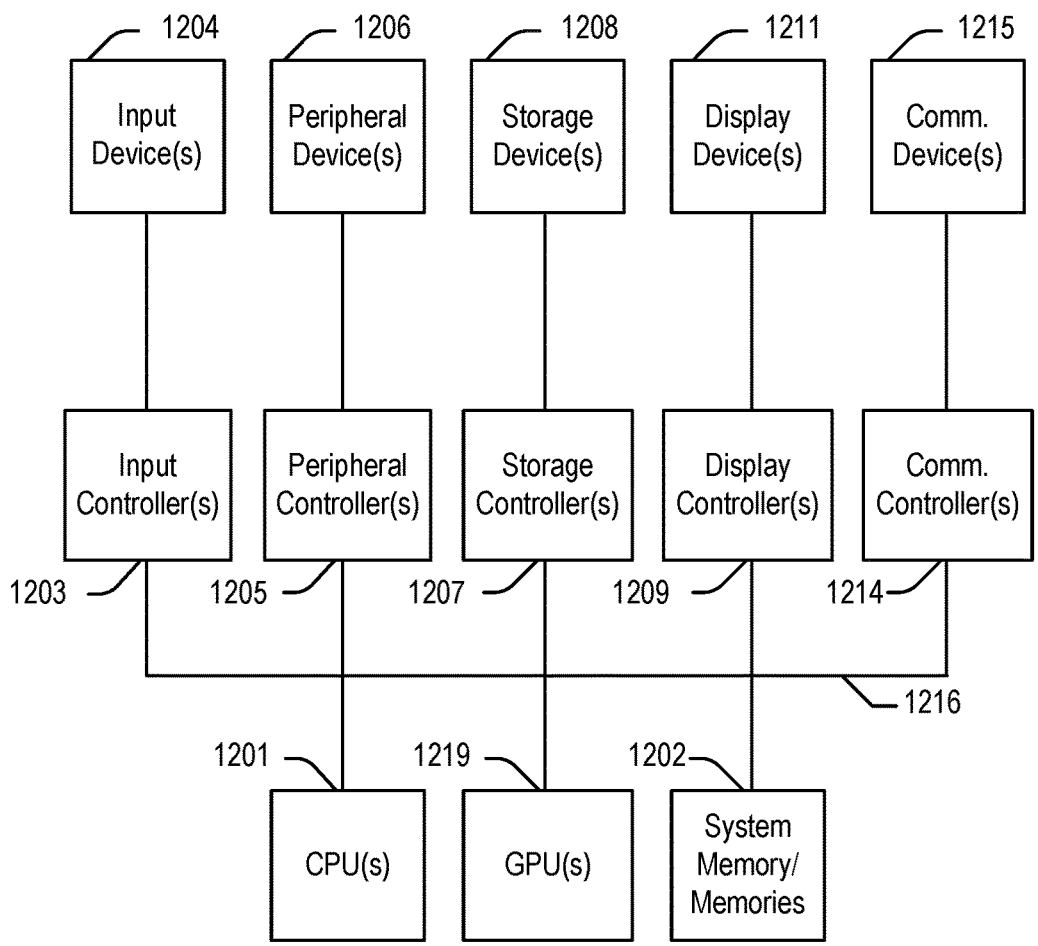
FIG. 12 depicts a simplified block diagram of a computing device/information handling system, in accordance with embodiments of the present document.

FIG. 12 depicts a simplified block diagram of a computing device/information handling system (or computing system) according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like, and may also include one or more graphics processing units (GPU) 1219 and/or a floating-point coprocessor for mathematical computations. System 1200 may also include a system memory 1202, which may be in the form of random-access memory (RAM), read-only memory (ROM), or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT), a thin film transistor (TFT) display, organic light-emitting diode, electroluminescent panel, plasma panel, or other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method, the method comprising:
    responsive to a training stop condition having not been reached, repeating a set of steps, the set of steps corresponding to a particular iteration for training a set of models, the set of steps comprising:
        training, by a first party using a set of training records, a first model that produces for a respective event corresponding to a respective training record of the set of training records:
            a first-party score related to a label classification of the respective event, wherein at least one first feature from a set of features for the respective event is not shared and at least one other feature from the set of features for the respective event is shared with a second party,
            wherein the respective training record corresponding to the respective event comprises an event identifier, a label about the respective event, and the set of features for the respective event,
            wherein the respective training record corresponds to, if available, a second-party score, generated previously by the second party using at least a set of second party features comprising at least one third feature that is not shared and at least one fourth feature that is shared with the first party, and
            wherein the second-party score is not available in a first iteration corresponding to an initial round of performing the set of steps for the training of the model that produces the first-party score, and the second-party score is available in a second iteration corresponding to a subsequent round of performing the set of steps for the training of the model that produces the first-party score;
        communicating the first-party score to the second party, for use by the second party to train a second model to produce another second-party score related to a label classification of the respective event; and
        receiving, by the first party, the other second-party score from the second party; and
    responsive to the training stop condition having been reached, outputting one or more trained models.

2. The computer-implemented method of claim 1, wherein the training stop condition comprises at least one of:
    a number of iterations have been reached;
    a sufficient prediction quality level tested on a test data set having been achieved;
    having reached a model's ability to improve; or a prediction error between iterations is less than a threshold.

3. The computer-implemented method of claim 1, further comprising:
   training, by the first party, a third model that produces for the respective event corresponding to the respective training record, a second first-party score related to a particular label classification of the respective event, the training of the third model using the set of training records and the second-party scores;
   communicating the second first-party score to the second party, for use by the second party to train a fourth model to produce a third second-party score related to a particular label classification of the respective event; and
   receiving, by the first party, the third second-party score from the second party.

4. The computer-implemented method of claim 1, further comprising:
   predicting a label for an unlabeled event using at least one of the one or more trained models.

5. The computer-implemented method of claim 4, wherein predicting a label for the unlabeled event using the one or more trained models comprises:
   responsive to a prediction stop condition having not been reached, repeating steps comprising:
      given associated event data associated with the unlabeled event, using a trained first-party model, at least some of the associated event data, and a second-party score of a prior iteration, if such exists and is available, to generate a first-party score;
      communicating the first-party score to the second party, in which the second party uses the first-party score to produce for the unlabeled event a second-party score related to a label classification of the unlabeled event;
      receiving the second-party score; and
   responsive to the prediction stop condition having been reached, outputting the label for the unlabeled event.

6. The computer-implemented method of claim 5, wherein the second party produces the second-party score for the unlabeled event by performing the steps comprising:
   using a trained second-party model, at least some of the associated event data of the unlabeled event, and the first-party score of a prior iteration to generate the second-party score.

7. The computer-implemented method of claim 4, further comprising:
   comparing the label predicted for the unlabeled event with a label predicted by the second party to determine whether the labels match.

8. An electronic device comprising:
   a memory; and
   a processor configured to:
      responsive to a training stop condition having not been reached, repeat a set of steps, the set of steps corresponding to a particular iteration for training a set of models, the set of steps comprising:
         train, by a first party using a set of training records, a first model that produces for a respective event corresponding to a respective training record of the set of training records:
            a first-party score related to a label classification of the respective event, wherein at least one first feature from a set of features for the respective event is not shared and at least one other feature from the set of features for the respective event is shared with a second party,
         wherein the respective training record corresponding to the respective event comprises an event identifier, a label about the respective event, and the set of features for the respective event,
         wherein the respective training record corresponds to, if available, a second-party score, generated previously by the second party using at least a set of second party features comprising at least one third feature that is not shared and at least one fourth feature that is shared with the first party, and
         wherein the second-party score is not available in a first iteration-corresponding to an initial round of performing the set of steps for the training of the model that produces the first-party score, and the second-party score is available in a second iteration corresponding to a subsequent round of performing the set of steps for the training of the model that produces the first-party score;
      communicate the first-party score to the second party, for use by the second party to train a second model to produce another second-party score related to a label classification of the respective event; and
      receive, by the first party, the other second-party score from the second party; and
   responsive to the training stop condition having been reached, output one or more trained models.

9. The electronic device of claim 8, wherein the training stop condition comprises at least one of:
   a number of iterations have been reached;
   a sufficient prediction quality level tested on a test data set having been achieved;
   having reached a model's ability to improve; or
   a prediction error between iterations is less than a threshold.

10. The electronic device of claim 8, wherein the processor is further configured to:
    train, by the first party, a third model that produces for the respective event corresponding to the respective training record, a second first-party score related to a particular label classification of the respective event, the training of the third model using the set of training records and the second-party scores;
    communicate the second first-party score to the second party, for use by the second party to train a fourth model to produce a third second-party score related to a particular label classification of the respective event; and
    receive, by the first party, the third second-party score from the second party.

11. The electronic device of claim 8, wherein the processor is further configured to:
    predict a label for an unlabeled event using at least one of the one or more trained models.

12. The electronic device of claim 11, wherein the processor is configured to predict the label for the unlabeled event using the one or more trained models by:
    responsive to a prediction stop condition having not been reached, repeating steps comprising:
       given associated event data associated with the unlabeled event, using a trained first-party model, at least some of the associated event data, and a second-party score of a prior iteration, if such exists and is available, to generate a first-party score;

communicating the first-party score to the second party, in which the second party uses the first-party score to produce for the unlabeled event a second-party score related to a label classification of the unlabeled event;

receiving the second-party score; and responsive to the prediction stop condition having been reached, outputting the label for the unlabeled event.

13. The electronic device of claim 12, wherein the second party produces the second-party score for the unlabeled event by performing the steps comprising:

using a trained second-party model, at least some of the associated event data of the unlabeled event, and the first-party score of a prior iteration to generate the second-party score.

14. The electronic device of claim 11, wherein the processor is further configured to:

compare the label predicted for the unlabeled event with a label predicted by the second party to determine whether the labels match.

15. A non-transitory computer-readable medium comprising:

computer-readable instructions that, when executed by a processor, cause the processor to perform one or more operations comprising:

responsive to a training stop condition having not been reached, repeating a set of steps, the set of steps corresponding to a particular iteration for training a set of models, the set of steps comprising:

training, by a first party using a set of training records, a first model that produces for a respective event corresponding to a respective training record of the set of training records:

a first-party score related to a label classification of the respective event, wherein at least one first feature from a set of features for the respective event is not shared and at least one other feature from the set of features for the respective event is shared with a second party, wherein the respective training record corresponding to the respective event comprises an event identifier, a label about the respective event, and the set of features for the respective event, wherein the respective training record corresponds to, if available, a second-party score, generated previously by the second party using at least a set of second party features comprising at least one third feature that is not shared and at least one fourth feature that is shared with the first party, and wherein the second-party score is not available in a first iteration-corresponding to an initial round of performing the set of steps for the training of the model that produces the first-party score, and the second-party score is available in a second iteration corresponding to a subsequent round of performing the set of steps for the training of the model that produces the first-party score;

communicating the first-party score to the second party, for use by the second party to train a second model to produce another second-party score related to a label classification of the respective event; and receiving, by the first party, the other second-party score from the second party; and responsive to the training stop condition having been reached, outputting one or more trained models.

16. The non-transitory computer-readable medium of claim 15, wherein the training stop condition comprises at least one of:

a number of iterations have been reached;

a sufficient prediction quality level tested on a test data set having been achieved;

having reached a model's ability to improve; or a prediction error between iterations is less than a threshold.

17. The non-transitory computer-readable medium of claim 15, wherein the one or more operations further comprise:

training, by the first party, a third model that produces for the respective event corresponding to the respective training record, a second first-party score related to a particular label classification of the respective event, the training of the third model using the set of training records and the second-party scores;

communicating the second first-party score to the second party, for use by the second party to train a fourth model to produce a third second-party score related to a particular label classification of the respective event; and receiving, by the first party, the third second-party score from the second party.

18. The non-transitory computer-readable medium of claim 15, wherein the one or more operations further comprise:

predicting a label for an unlabeled event using at least one of the one or more trained models.

19. The non-transitory computer-readable medium of claim 18, wherein predicting the label for the unlabeled event using the one or more trained models comprises:

responsive to a prediction stop condition having not been reached, repeating steps comprising:

given associated event data associated with the unlabeled event, using a trained first-party model, at least some of the associated event data, and a second-party score of a prior iteration, if such exists and is available, to generate a first-party score;

communicating the first-party score to the second party, in which the second party uses the first-party score to produce for the unlabeled event a second-party score related to a label classification of the unlabeled event;

receiving the second-party score; and responsive to the prediction stop condition having been reached, outputting the label for the unlabeled event.

20. The non-transitory computer-readable medium of claim 19, wherein the second party produces the second-party score for the unlabeled event by performing the steps comprising:

using a trained second-party model, at least some of the associated event data of the unlabeled event, and the first-party score of a prior iteration to generate the second-party score.

* * * * *

UNITED STATES PATENT AND TRADEMARK OFFICE
CERTIFICATE OF CORRECTION

| | |
|---|---|
| PATENT NO. | : 11,989,633 B2 |
| APPLICATION NO. | : 16/258116 |
| DATED | : May 21, 2024 |
| INVENTOR(S) | : Ashish Goel et al. |

It is certified that error appears in the above-identified patent and that said Letters Patent is hereby corrected as shown below:

In the Claims

Column 18, Line 16 (Claim 8): "a first iteration-corresponding to an initial round" should read: "a first iteration corresponding to an initial round";

Column 19, Line 54 (Claim 15): "a first iteration-corresponding to an initial round" should read: "a first iteration corresponding to an initial round".

Signed and Sealed this
Third Day of September, 2024

Katherine Kelly Vidal
*Director of the United States Patent and Trademark Office*